United States Patent [19]

Rogers

[11] 4,176,774

[45] Dec. 4, 1979

[54] COIL BREAKAWAY DEVICE

[76] Inventor: John W. Rogers, 22175 Douglas Rd., Shaker Heights, Ohio 44122

[21] Appl. No.: 966,432

[22] Filed: Dec. 4, 1978

[51] Int. Cl.² .............................................. B26F 3/00
[52] U.S. Cl. ...................................... 225/103; 225/93
[58] Field of Search ...................... 225/103, 102, 1, 2, 225/96, 96.5, 4, 97, 93; 214/DIG. 3, DIG. 4, 1 P, 1 PA; 242/56.4, 56.1

[56] References Cited

U.S. PATENT DOCUMENTS

| | | | |
|---|---|---|---|
| 2,537,464 | 1/1951 | Holmberg | 225/97 |
| 2,740,474 | 4/1956 | Harrison | 225/93 X |
| 2,742,965 | 4/1956 | Drummond, Jr. | 225/93 X |
| 2,998,134 | 8/1961 | Gray | 225/4 X |
| 3,559,858 | 2/1971 | Osteen | 225/93 X |
| 3,904,097 | 9/1975 | Grambo, Jr. et al. | 225/103 |

*Primary Examiner*—Frank T. Yost
*Attorney, Agent, or Firm*—John F. Carney

[57] ABSTRACT

Apparatus is described for separating individual coils from a construct of wound sheet metal web material that has been partially slit along parallel lines to produce parting lines containing frangible connections between adjacent coils. The apparatus is carriage-mounted and includes a mandrel assembly adapted to enter the construct center and carrying fluid operated means for anchoring the construct and for displacing the coil to be removed from the remainder of the construct thereby breaking the connections attaching adjacent coils thus to separate the selected coil from the construct.

12 Claims, 7 Drawing Figures

COIL BREAKAWAY DEVICE

BACKGROUND OF THE INVENTION

In the manufacture of flat rolled metal, it is the practice to produce the web product with a greater width than is required by the end user and to subsequently slit the web into narrower strips of the desired lateral dimension. According to the practice, the metal web is coiled following rolling, after which, in a separate operation, the coiled web is placed on an uncoiler, unwound, trained through a slitting station and the so-produced strips rewound on the coiler as a number of separate coils.

An improved practice for the production of coiled strip is disclosed in U.S. Patent Application Ser. Nos. 713,599, 818,795 and 819,313, filed Aug. 12, 1976, July 25, 1977 and July 27, 1977 respectively. According to this improved practice, following rolling of the metal, the web is slit along lines parallel to its edge in a manner that produces parting lines containing intermittently spaced tabs that interconnect the adjacent edges of the strips whereby, upon coiling, there results a construct containing a plurality of coils joined by frangible connections. It is contemplated that shipment and the majority of the handling operations will be undertaken with the construct intact. Thereafter, either at the point of use or at an intermediate station, the individual sheet metal strips can be detached from the construct coincident with their unwinding therefrom, as, for example, as they are fed to a press or punch.

It is desirable, in some applications however, as for example, where strip is to be fed simultaneously to a number of separate process machines, to sever the respective strips from the construct as wound coil units in order to facilitate handling of the material. Although apparatus for separting connected rolls of paper or other light sheet materials are well known, such apparatus have serious size and force-producing limitations as to prevent their use on sheet metal product as contemplated in these applications where a coil construct may weigh over ten tons and be upwards of four feet in diameter and where an individual coil in the construct weighs upwards of four hundred pounds per inch of width. In these applications, moreover, forces as great as 10,000 p.s.i. are required to simultaneously fracture all of the tacks connecting an individual coil to the construct.

It is toward the provision of such apparatus, therefore, that the present invention is directed.

SUMMARY OF THE INVENTION

According to the present invention, there is provided apparatus for detaching a wound coil from a construct having an axial opening therethrough and including a plurality of axially spaced coils interconnected by frangible connections. The apparatus comprises a base, a frame upstanding from the base and expandable mandrel means projecting from the frame of a size, when contracted, to be received within the central opening of the construct. The mandrel includes anchor means adapted to engage the surface of the construct within the central opening and movable means axially spaced from the anchor means and radially displaceable from the axis of the mandrel to impart a radial force against the surface of the construct opening of a magnitude sufficient to fracture the connections between adjacent coils.

For a better understanding of the invention, its operating advantages and the specific objectives obtained by its use, reference should be made to the accompanying drawings and description which relate to a preferred embodiment thereof.

DESCRIPTION OF THE PREFERRED EMBODIMENT OF THE INVENTION

Figure 1:
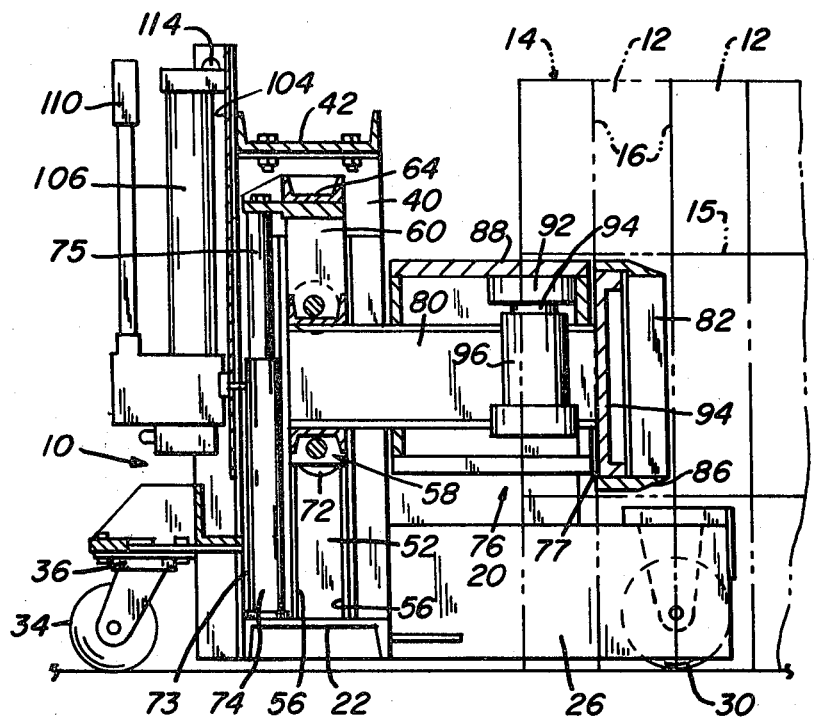
FIG. 1 is a sectional elevation of a coil breakaway apparatus constructed according to the present invention taken along line 1-1 of FIG. 3.

In the drawings there is shown apparatus 10 operative to separate coils 12 from a construct 14 of wound sheet metal web material. The construct 14 is of a type described in U.S. patent application Ser. No. 713,599 to J. W. Rogers in which the construct is formed of wound sheet metal web material having a plurality of laterally spaced parting lines 16 in the surface thereof defining frangibly interconnected coiled strips therebetween. The parting lines 16 contain intermittently spaced tabs (not shown) formed of residual web material bridging the interstice between adjacent strips and forming the connections between the coils 12. The construct 14 is wound with the parting lines 16 disposed in substantial coplanar or radially aligned relation such that individual strips can be detached as wound coils 12 by the concurrent fracture of the connecting tabs disposed along the respective parting lines.

The coil separating apparatus 10 of the present invention is operative to so-fracture the connecting tabs of a construct and comprises an upstanding frame 20 supported on a transverse base member 22. A pair of oppositely spaced horizontal legs 24, 26 extend forwardly of the transverse member 22 in straddling relation to the construct 14 and comprise the remainder of the apparatus base. Wheels 28 and 30 disposed outboard of the free ends of the legs 24 and 26 respectively in axle-supporting brackets 32, together with a third wheel 34 attached in a swivel mount 36 rearwardly of the frame 20, impart mobility to the apparatus.

The frame 20 includes a pair of oppositely spaced columns 38 and 40 bottom supported on the transverse base member 22 and interconnected at the top by top plate 42. The columns 38 and 40 are provided on their facing surfaces respectively with spaced angles 44 and 46 defining vertical tracks 52. Each of the tracks 52 may be provided with wear plates 56 as shown.

A carriage, indicated generally as 58, is arranged for vertical movement, up and down in the tracks 52. It includes a pair of oppositely spaced vertical braces 60, 62 interconnected at the top by brace 64. Vertical braces 60, 62 are each apertured at vertically spaced locations to mount vertically spaced fixed axles 68 and 70 whose respective opposite ends mount free-running wheels 72 arranged to run in the respective tracks 52. The carriage 58 is powered in the up and down direction as hereinafter explained by a double-acting fluid motor 73 including an upstanding cylinder 74 bottom supported on the transverse base member 22 and having a movable ram 75 connected to the carriage top brace 64.

Figure 2:
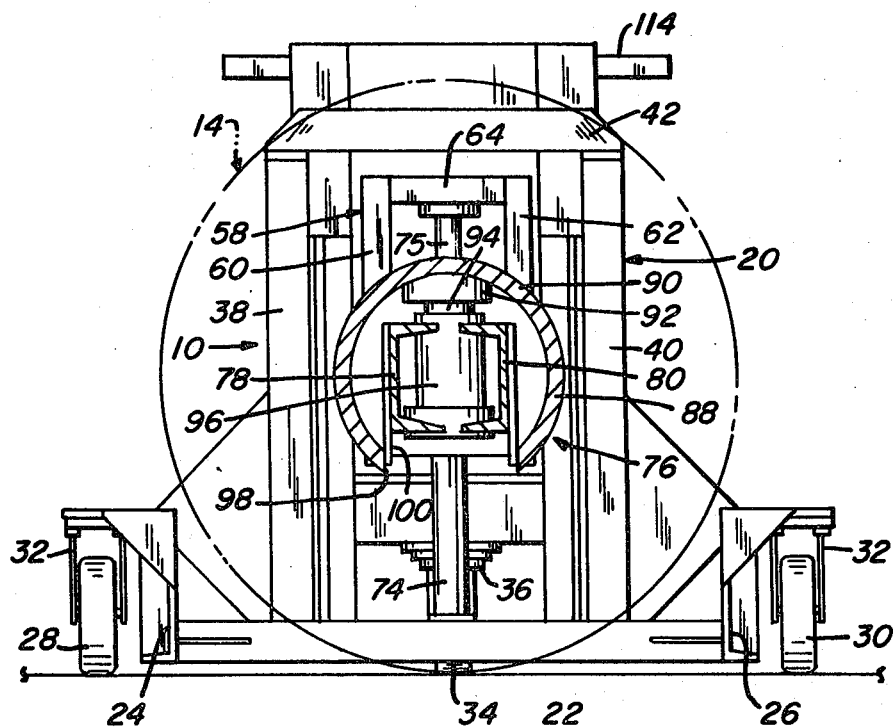
FIG. 2 is a view taken along line 2-2 of FIG. 3.
Figure 3:
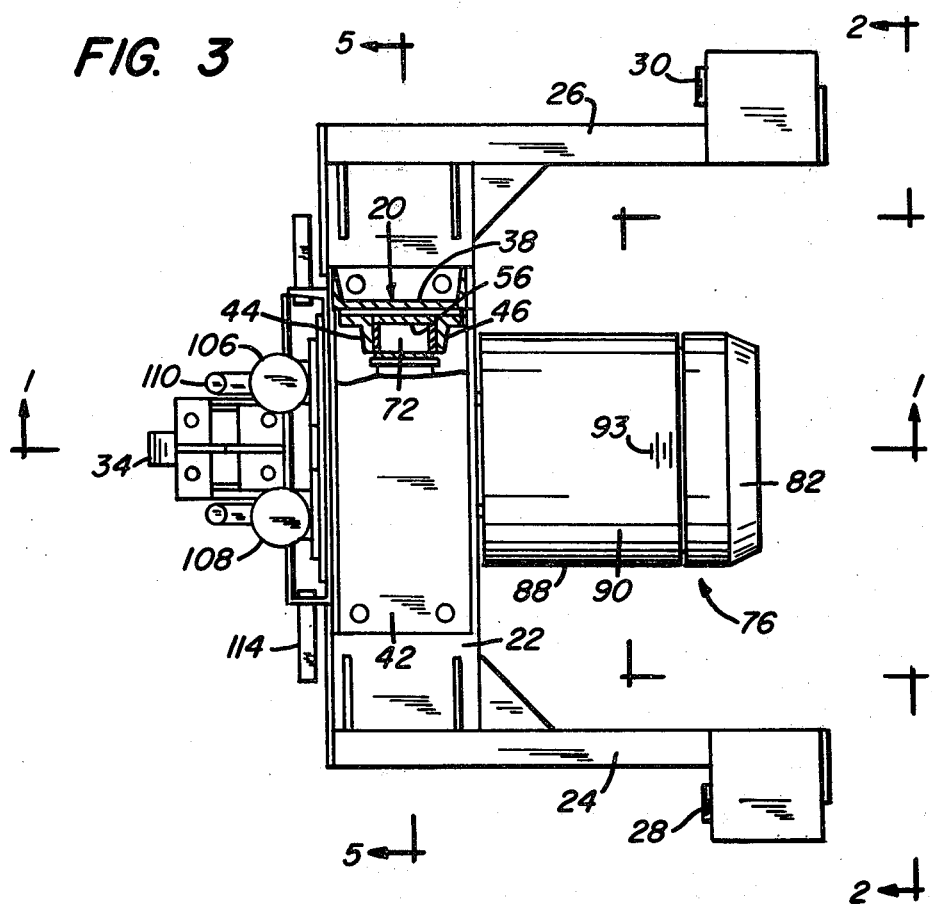
FIG. 3 is a plan view of the apparatus of FIG. 1.
Figure 4:
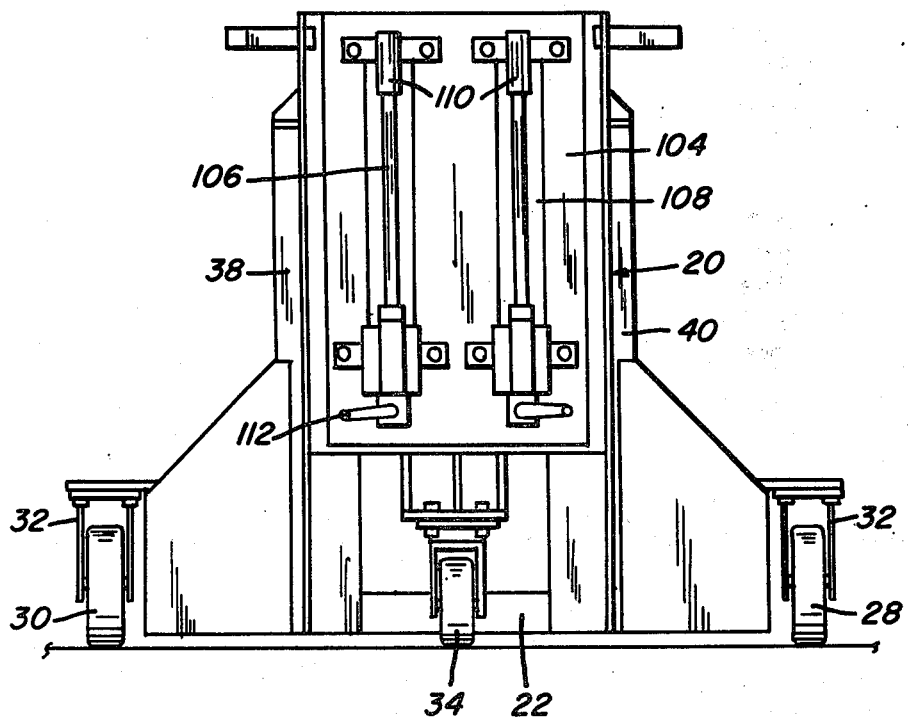
FIG. 4 is an end view of the apparatus of FIG. 1 taken from the left hand end thereof.
Figure 5:
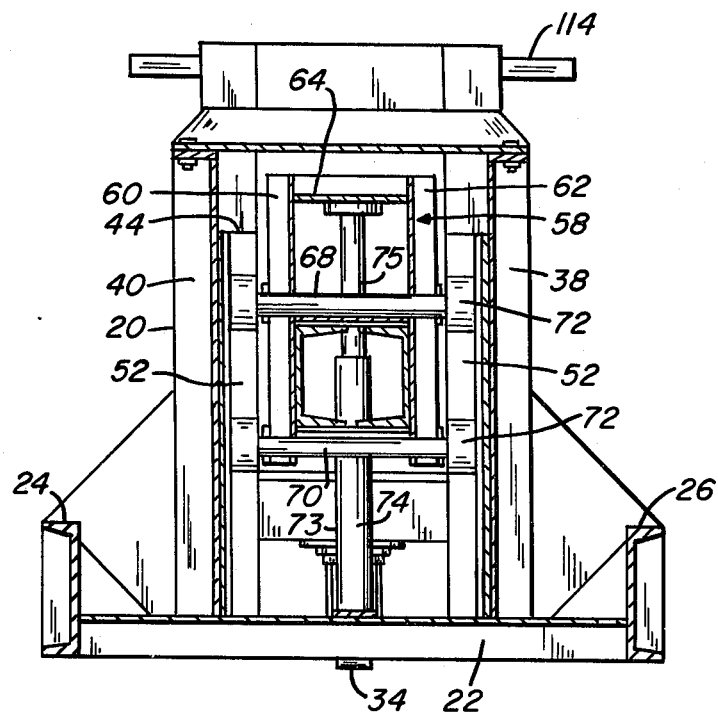
FIG. 5 is a sectional view taken along line 5-5 of FIG. 3.

The carriage 58 mounts the mandrel assembly 76 which extends forwardly therefrom parallel to, and substantially equidistantly spaced between, the legs 24 and 26. The mandrel assembly 76 includes a pair of oppositely spaced support beams 78, 80 attached at one end to the carriage 58. At their free ends the beams 78 and 80 mount a nose-anchor 82 having a generally cylindrical base 94 and a frusto-conically formed leading end 86. Closely adjacent the rear end of nose-anchor base 84 and separated therefrom by a space 77 is a vertically movable member 88, the placement of which is operative to concurrently fracture the tabs in a parting line 16 by imparting, in cooperation with the nose-anchor 82 oppositely directed forces against the interior surface of the axial opening of the construct on opposite sides of the selected parting line. As shown best in FIG. 2 the member 88 is C-shaped in section having generally cylindrical exterior surface 90. The member 88 is attached to a pad 92 on the end of piston 94 of a double-acting fluid motor cylinder 96 that is fixedly attached between the mandrel beams 78 and 80. The terminal end edges 98 of the member 88 are caused to engage plates 100 on the respective beams to guide the vertical movement of the member.

A mounting plate 104 is attached to the rear face of the frame 20 serves to mount two hydraulic actuating pumps 106 and 108 that connect each with one of the fluid motors 73 and 96 respectively by means of connecting lines (not shown). Each actuating pump includes a manually operated pump handle 110 for supplying fluid to the respective motors and directional valve 12 for selectively pumping the respective pistons in the upward or downward direction.

Handles 114 are provided adjacent the upper end of the frame 20 to enable the apparatus to be manually manipulated with respect to the construct 14 for operatively locating the device with respect thereto, as hereinafter described.

The apparatus 10 is arranged to operate on a sheet metal coil construct 14 that rests on a floor with the construct axis horizontally disposed thereby exposing the ends of the axial opening, indicated as 15 in the drawing, for reception of the mandrel assembly 76. Thus, the apparatus 10 is manually manipulated until the mandrel assembly 76 enters the construct opening 15 to an extent such that the nose-anchor 82 is disposed on one side of the selected parting line 16 and the member 88 disposed on the other side thereof. For centering purposes the exterior surface 90 of the member 88 may be etched with a graduated scale 93 to locate the space 77 between the member 88 and the nose-anchor 82 in alignment with the selected construct parting line 16.

Figure 6:
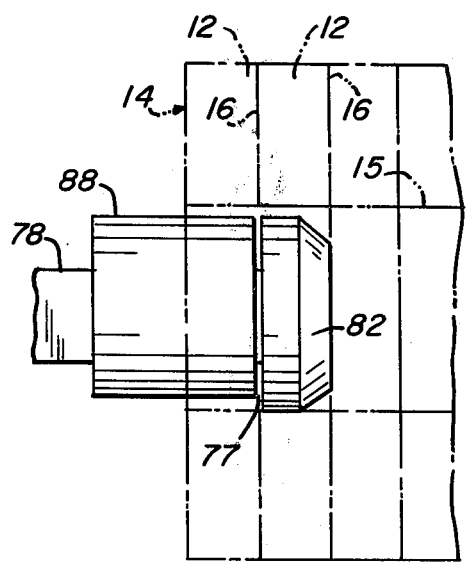
FIG. 6 is a partial elevational view of the mandrel assembly according to the present invention in anchor engagement with a coil construct.
Figure 7:
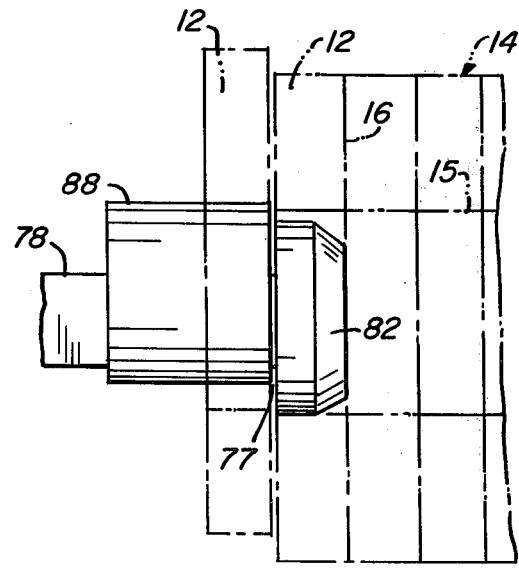
FIG. 7 is a view similar to FIG. 6 illustrating the mandrel assembly following detachment of a coil from the construct.

Following this, and with the directional valve 112 of actuating pump 106 properly disposed, the associated pump handle 110 is manipulated to pass operating fluid to motor 73 thereby forcing carriage 58 downwardly and causing nose-anchor 82 to apply a downward force against the interior surface of the construct, anchoring the construct with respect to the floor as shown in FIG. 6. Thereafter, with the directional valve 112 of actuating pump 108 properly disposed, the associated pump handle 110 is operated to pass operating fluid to the fluid motor 96. This operation causes member 88 to rise and impart an upward force against the inner surface of the coil 12 to be removed. Pumping continues until the upward force generated is sufficient to fracture the tabs connecting the coil 12 to the construct 14 thereby separating the coil from the construct as shown in FIG. 7.

Following separation of the coil valve 112 associated with actuating pump 106 is reversed and the associated pump 110 operated to raise the carriage 58 and nose-anchor 82 releasing the apparatus 10 from the construct 14 whereupon it can be withdrawn therefrom carrying the separated coil 12.

It will be appreciated that by means of the invention there is provided apparatus for effectively separating wound sheet metal coils from a construct. By arranging construct-anchor means, tab fracturing means and separated coil transport means integrally in a self-contained, mobile unit coils can be expeditiously broken from a construct and removed therefrom with a minimum of effort and without danger of marring the edges or surface of the sheet metal product attendant with separation of the coils.

Various changes in the details, materials and arrangements of parts which have been herein described and illustrated in order to explain the nature of the invention, may be made by those skilled in the art within the principle and scope of the invention as expressed in the appended claims.

What is claimed is:

1. Apparatus for detaching a wound coil from a construct having an axial opening therethrough and including a plurality of axially spaced coils interconnected by frangible connections, said apparatus comprising:
   (a) a base;
   (b) a frame upstanding from said base;
   (c) expandable mandrel means projecting from said frame of a size, when contracted, to be received within the central opening of said construct, said mandrel including;
      (i) anchor means adapted to engage the surface of said construct within said central opening; and
      (ii) movable means axially spaced from said anchor means and radially displaceable from the axis of said mandrel to impart a radial force against the surface of said construct opening of a magnitude sufficient to fracture the connections between adjacent coils.

2. Apparatus as recited in claim 1 including fluid motor means mounted on said mandrel means and operatively connected to said movable means for displacing the same with respect to said mandrel axis.

3. Apparatus as recited in claim 2 in which said mandrel means is vertically movable with respect to said frame.

4. Apparatus as recited in claim 3 including:
   (a) a mandrel carriage mounting said mandrel means and being movably secured to said frame; and
   (b) means for selectively moving said carriage in alternate vertical directions.

5. Apparatus as recited in claim 4 in which said frame includes a vertically extending guide track and said mandrel carriage includes guide wheels movable in said track.

6. Apparatus as recited in claim 5 including fluid operated motor means mounted on said base operatively connecting said mandrel carriage; and means for selectively actuating said motor means for movement of said carriage.

7. Apparatus as recited in claim 1 in which said mandrel means includes:
(a) a structural support extending from said frame;
(b) a substantially cylindrical member at the free end of said support forming said anchor means;
(c) a generally cylindrical body straddling said support for movement with respect to the longitudinal axis thereof; and
(d) motor means mounted on said support and operatively connected to said cylindrical body for imparting movement thereto.

8. Apparatus as recited in claim 7 in which said body is generally C-shaped and oppositely spaced slide plates on said support adapted to slidably engage the facing edges of said body for guiding the vertical movement thereof.

9. Apparatus as recited in claim 5 including manually operated actuator means mounted on said frame and operatively connected to the respective fluid motors for selective actuation thereof.

10. Apparatus as recited in claim 1 including wheel means on said base for imparting mobility thereto.

11. Apparatus for detaching a wound coil from a horizontally disposed construct having an axial opening therethrough and including a plurality of axially spaced coils interconnected by frangible connections, said apparatus comprising:
(a) a base, open at one end for reception of said construct;
(b) a frame upstanding from said base;
(c) expandable mandrel means projecting from said frame of a size, when contracted, to be received within the axial opening of said construct, said mandrel including:
 (i) anchor means vertically movable with respect to said frame;
 (ii) means for moving said anchor means into engagement with the surface of said construct within said axial opening to anchor the same with respect to said mandrel.
 (iii) radially displaceable means axially spaced from said anchor means adapted, when actuated, to impart a radial force against the surface of said construct opening of a magnitude sufficient to fracture the connections between adjacent coils; and
 (iv) means for actuating said radially displaceable means.

12. Apparatus as recited in claim 11 including wheel means on said base for imparting mobility thereto.

* * * * *